United States Patent
Long et al.

(10) Patent No.: US 6,714,795 B1
(45) Date of Patent: Mar. 30, 2004

(54) RADIO TELEPHONE SYSTEM WITH ONE-TO-MANY DISPATCH SYSTEM

(75) Inventors: Earle G. Long, Chesterfield, MO (US); Michael H. Retzer, Palatine, IL (US); Nuruddin Ladhani, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 467 days.

(21) Appl. No.: 09/603,099

(22) Filed: Jun. 26, 2000

(51) Int. Cl.[7] .............................. H04B 7/00; H04Q 7/20
(52) U.S. Cl. ...................... 455/518; 455/519; 455/520; 455/515; 455/416
(58) Field of Search .................................. 455/515, 516, 455/518, 519, 520, 521, 414.1, 416; 370/328, 329, 337

(56) References Cited

U.S. PATENT DOCUMENTS 5,983,099 A  11/1999  Yao et al. ................... 455/426
6,449,491 B1 *  9/2002  Dailey ........................ 455/518

* cited by examiner

Primary Examiner—William Trost
Assistant Examiner—Stephen Agosta

(57) ABSTRACT

A one-to-many dispatch method for use in a TDMA or other wireless telephone system. The one-to-many dispatch call is placed by sending a Request message 204 from a Personal Station PS 112 to a Control Center Station (CS) 120 which assigns a channel with an Assignment message 208. The PS 112 sends a call setup message over the control channel resulting in a channel assign message 242 being broadcast repeatedly. Call connect messages over the Assigned Channel AC 244 are also repeated from the CS 120 to indicate the open connection. A hang timer is started when the PS 112 ceases transmission of voice and the connection is torn down upon expiry of the hang timer unless another PS transmits a call setup message 234 on the Assigned Channel AC before the expiry of the hang timer.

4 Claims, 6 Drawing Sheets

RADIO TELEPHONE SYSTEM WITH ONE-TO-MANY DISPATCH SYSTEM

FIELD OF THE INVENTION

This invention relates generally to the field of wireless communication. More particularly, in certain embodiments, this invention relates to a system which overlays one-to-many Dispatch functions onto radio telephone systems.

BACKGROUND OF THE INVENTION

Many traditional land mobile radio systems provide a mechanism for establishing a one-to-many talkgroup function wherein members of a talkgroup can communicate with one another in a simplex communication arrangement. In such an arrangement, for example, any member of the talkgroup can communicate with other talkgroup members by pressing a Push-To-Talk (PTT) switch and speaking. All other members of the talkgroup are able to hear the communication and can follow up with responses, which operate in a similar manner. In these traditional land mobile arrangements, subscriber selection and participation in a particular desired talkgroup, while excluding participation in undesired talkgroups, and security and Authorization for allowing participation in any particular talkgroup, is handled by a variety of mechanisms ranging from simple RF frequency selection/carrier squelch, PL (Private Line™ subaudible tone signaling), DPL™ (Digital Private Line data under voice), to digital identification codes.

In the more telephone connection-oriented radio systems, like AMPS (Advanced Mobile Phone Service) Cellular, or particularly PHS (Personal HandyPhone Service) or DECT (Digital European Cordless Telephone) digital Time Domain Multiple Access (TDMA) systems, the model for communication has traditionally been one-to-one, having some (perhaps lengthy) processes for selecting the desired call destination, obtaining services from a serving Cell Station (or Control Center Station), and excluding service from those not authorized. Generally these more modern systems offer the user and the system operator a richer set of convenience or security features, such as Caller ID or voice scrambling, with these richer features often coming with the benefit of increased battery life due to synchronous Paging protocols. One of the problems with adding a "Dispatch"— like function to these traditionally telephone oriented systems is that most of these improvements have come at the cost of increased call setup time and transmission overhead when compared to traditional Land-Mobile radio systems. A one-to-one telephone call is expected to take longer to set up than a quick Push-To-Talk Dispatch call. A single telephone user may only need to register with the system infrequently in order to inform the system of the individual's presence. But, a Dispatch user may need to handshake with the system for participation with every different talkgroup, or upon selecting a different set of talkgroups. Also, many of the features intended for one-to-one connections, particularly voice scrambling key exchanges and synchronization, become unworkable or unsecure when applied in a one-to-many model. Also, the "one-shot handshake" nature of a one-time telephone call setup is not adequate for setting up and continuing a one-to-many call, where multiple receivers may need to be gathered, or come into or out of the call at varying instants.

Thus, there are many problems associated with trying to impose a one-to-many talkgroup protocol over a TDMA cellular type telephone communications model. However, it would prove advantageous to overcome these problems to provide a convenient call setup, late joining, resuming and teardown protocol to accomplish such dispatch-like communications over a wireless telephone network such as the Japan PHS system.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
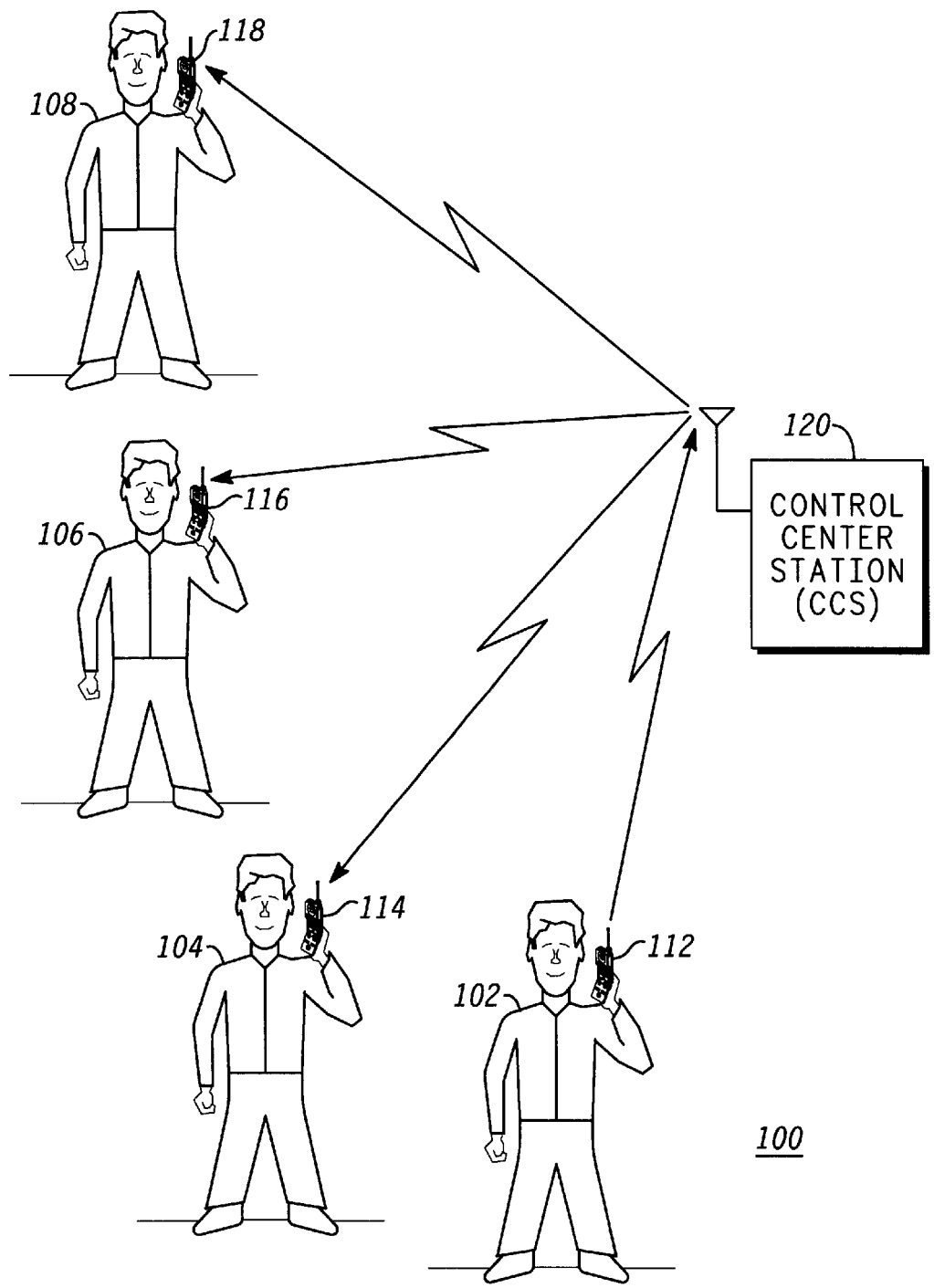
FIG. 1 is an illustration of a talkgroup engaging in a one-to-many dispatch call according to embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Most "modern" telephone oriented communications systems are based upon a layered model originally developed by (or at least strongly influenced by) the Bell SS7 specification. In this model, call is setup is accomplished at a relatively high stack layer (L3 CC, Layer 3 Call Control) after a reliable channel has already been established between the endpoint terminal and the central office (Control Center Station). Each endpoint terminal requires a dedicated reliable channel, even for such applications as a "conference bridge," where multiple endpoints participate in a single call. Much of this model is due to traditional wired implementations, where it is necessary to establish a wire to the endpoint before a call is completed. In wireless systems the problem is somewhat different; the channel can exist between a Control Center Station (Cell Station) and multiple endpoint Handsets (Personal Stations), but reliable acknowledged connections to many endpoints are very scarce, very slow, or both. The present invention utilizes the framework of an existing RF telephony system to efficiently implement one-to-many Dispatch call control.

The present exemplary embodiment of the invention provides a method for a first initiating subscriber radio to request and receive services for placing a one-to-many talkgroup call, and for rapidly notifying talkgroup participants of a call in progress. Further, this exemplary embodiment of the invention provides a method for reserving the received services for use by the talkgroup for a continuing conversation following the release of resources by a participating subscriber. Further, this exemplary embodiment of the invention provides for a second caller, possibly different from the first, to resume communicating on the services, in a manner requiring very low signaling overhead to facilitate unbroken communication. This exemplary embodiment of the invention also provides a method for releasing services, and notifying talkgroup participants of the release as will be described in the context of a TDMA system such as the Japan HandyPhone PHS system.

A feature provided to the end user by embodiments of this invention is functionally similar to Talk Group communication, which has been available in traditional trunked wireless communications systems such as those available from Motorola, Inc. for quite some time. The exemplary embodiment to follow can be applied to systems such as RCA STD-28 PHS (commonly known as Japan HandyPhone) to add value to the PHS system. The exemplary embodiment of the invention shown here is implemented in such a manner as to remain in compliance with the public PHS standard, and could be overlaid over a PHS system to add the disclosed Dispatch capability to existing public networks.

Referring now to FIG. 1, a talkgroup is shown engaging in a one-to-many Dispatch call in accordance with the present invention. In this illustration, each user 102, 104, 106 and 108 has a radiotelephone handset or other device referred to herein as a Personal Station (PS) 112, 114, 116 and 118 respectively. In the arrangement shown in FIG. 1 as 100, User 102 is engaged in outbound communication through the Control Center Station (CS) 120 (a Cellular Communication Station) which repeats his messages to each of the users 104, 106 and 108 via their PS 114, 116 and 118 respectively. The directions of the arrows in FIG. 1 represent the direction of outbound speech communication during voice dispatch messages, but not the direction of the associated signaling messages that may be associated therewith as will become evident on consideration of FIGS. 2–5.

In implementing the current embodiment of the invention, several channels are used. In this context, the word "channels" should be broadly interpreted to embrace an identified communications pathway, and may be embodied, for example, by a particular radio frequency, a periodic time division slot, or a message header signifying some particular routing or disposition of the message payload. The first channel is used for resource access control between the CS 120 and all PS's, and is referred to as the Common Control Channel (CCH). In this embodiment, the CCH is provided by a pair of dedicated periodic TDMA time slots. One slot of the pair is for communication in the downlink direction from CS 120 to PS; the other slot of the pair is for communication in the uplink direction from a PS to the CS 120. The downlink CCH slot is monitored by all PSs in the system for control information in the downlink (CS to PS) direction. In the uplink direction (PS to CS), the CCH channel is accessed by each PS using a contention system.

The second channel used in this embodiment of the invention is the Paging Channel (PS), which is a subset of the CCH channel in the PHS exemplary embodiment of the invention. The Paging Channel is simply one of the numbered slots of the CCH, which has been designated to broadcast paging messages to the PS members of a particular talkgroup. Using a subset of the CCH, these paging messages are sent out the downlink from the CS 120 on the Common Control Channel, but at some periodic rate slower than the overall CCH rate. Hence the CCH can support paging signaling to multiple talkgroups in a non-interfering manner.

The third channel, in this embodiment, is a TDMA channel slot temporarily assigned for the exclusive use by a talkgroup for voice and signaling related to the temporary call in progress, which is referred to herein as the "Assigned Channel", "Assigned Communication Channel", or "Channel Assignment". This channel is also designated as AC herein. While these specific channels are used in the PHS implementation of this embodiment, it should be clear to those of ordinary skill in the art that many variations are possible within the framework of other communication systems without departing from the present invention.

Figure 2:
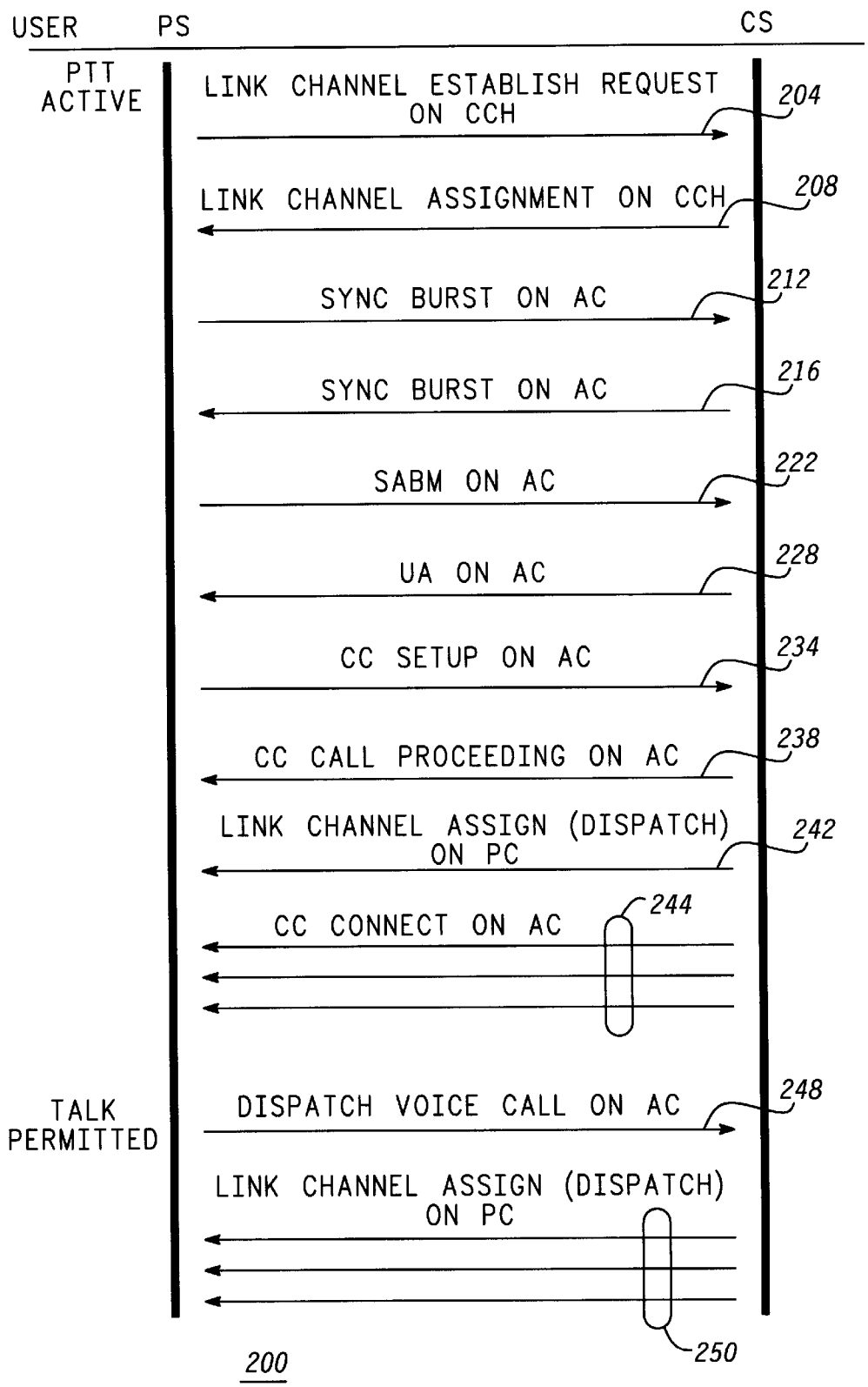
FIG. 2 is a message flow diagram illustrating a method for initiating a one-to-many dispatch call according to embodiments of the present invention.

Referring now to FIG. 2, a message flow diagram illustrates a method for initiating one-to-many Dispatch calls in accordance with embodiments of the present invention. When the User activates his Push-To-Talk (PTT) button on his Personal Station (PS) a Link Channel Establish Request message 204 is transmitted by the PS to Control Station (CS) 120 over Common Control Channel CCH. The communication of the Link Channel Establish Request may be via a contention system to contend for the available bandwidth of the Common Control Channel CCH in the uplink direction. When the Link Channel Establish Request message 204 is received by the CS 120, a Link Channel Assignment message 208 is returned from the CS 120 to the PS (112 in this case). Again, the Common Control Channel CCH is used to downlink the message to PS 112. The Link Channel Assignment message 208 contains a slot assignment in the TDMA frame for voice communication (the Channel Assignment or Assigned Channel AC). The Assigned Channel AC is used for communication of control information from this point on, with exceptions that will be explained.

The user's PS 112 then transmits a Sync Burst message 212 over the assigned channel AC and a reply is received over the Assigned Channel AC as a Sync Burst message 216. These Sync Burst messages 212 and 216 are used to synchronize the PS 112 and CS 120. Next a SABM (Set Asynchronous Balanced Mode) is transmitted from the PS 112 to the CS 120 which is answered with a UA (Unnumbered Acknowledged) message 228 from CS 120 back to PS 112. The SABM message 222 and the UA message 228 are used for error control functions in a conventional manner as will be appreciated by those of ordinary skill in the art and are transmitted using the Assigned Channel AC TDMA slot. The CS 120 and the requesting PS 112 go through this sync burst/SABM/UA exchange which establishes very highly reliable communication for purposes of transporting accurately the CC (Call Control) SETUP (and subsequent CC Call Proceeding) messages. These messages may be rather long, and the process is made reliable by numbering and error detecting each piece of the long message, acknowledging at the receiving end, and retrying if any piece of the message is lost. The SABM (Set Asynchronous Balanced Mode) and UA (Unnumbered Acknowledged) exchange actually initializes this numbering of these pieces. This reliable communication is part of various similar standards, like PHS RCR STD-28, and is really just a minor variation on CCITT v.42.

A CC SETUP message 234 is then transmitted from the PS 112 to the CS 120. This CC SETUP message requests Dispatch service, and includes the ID of the requesting PS 112. The CC SETUP message is followed by a CC Call Proceeding reply message 238 from the CS 120 to the PS 112, both using the Assigned Channel AC. At this point, the CS 120 begins transmitting repeated LINK CHANNEL ASSIGN (DISPATCH) messages on the Paging channel (not the AC) that include the talkgroup ID, using the dedicated Paging slot as described above. These LINK CHANNEL ASSIGN messages are transmitted periodically throughout the call.

Prior to this point, the system operated in an acknowledged mode of communication of control information. From this point on, the system begins to use repetition of unacknowledged messages for control information. Once the CC SETUP and CC Call Proceeding messages are sent and received correctly, the highly reliable acknowledged signaling between the initiating PS 112 and the CS 120 is removed. Further signaling on the AC (because it now may be going to many listeners in the group) is not acknowledged. Reliability here is provided by repeating the message (like CC CONNect or CC RELease) many times until the correct response is received. These CC CONNect and CC RELease messages (and the CC SETUP message used for a re-key request) should preferably be very short, because they cannot be readily broken apart, numbered, transported reliably, and put back together at the receivers.

The first CC CONNECT message is not sent until after the first LINK CHANNEL ASSIGN(DISPATCH) message is sent. This assures that at least one gather message (LINK CHANNEL ASSIGN(DISPATCH)) has gone out to the entire talkgroup before the requesting PS 112 gets permission to talk.

A CC CONNECT message 244 is transmitted repeatedly on the Assigned Channel AC to indicate to the requesting PS 112 that the voice request has been granted. The CC CONNECT message 244 contains the ID of the requesting PS 112, to notify that this PS 112 has been given permission to talk. This CC CONNECT message 244 is repeated on the AC until heard by the requesting PS 112, at which time the requesting PS 112 begins to transmit voice data on the uplink AC. Upon receipt of the CC CONNECT message 244, the user 102 of PS 112 is permitted to talk and can proceed with an outgoing DISPATCH VOICE CALL 248 over the Assigned Channel AC. Upon receiving the uplink voice on the AC, the CS 120 stops repeating CC CONNECT, and begins to retransmit the received voice data on the AC downlink. Meanwhile, LINK CHANNEL ASSIGN (DISPATCH) messages 250 are periodically repeated by the CS 120 over the Paging Channel.

The periodic repeating of these messages provides reliability to an otherwise less reliable communication path. The CC CONNECT messages 244 which are repeated over the Assigned Channel AC provide indication to the PS 112, 114, 116 and 118 of the ID of the device which has been granted permission to talk. The repeated LINK CHANNEL ASSIGN (DISPATCH) messages 242 transmitted over the Paging Channel PC serve to continually/periodically alert all members of the talkgroup who might not have received an earlier transmission that there is a one-to-many talkgroup dispatch message in progress. Thus, if a user turns on his radiotelephone after the call has been established, he will be informed of the call and can join a call already in progress.

Messages on the CCH, where resources are contended for by perhaps many users, are not inherently "reliable." However, overall call reliability is provided on this CCH channel in this example by an upper level retry mechanism, not specifically described here, which may be somewhat slow. Once the assignment is made to the dedicated AC, signaling becomes more reliable because of the lack of contention (by other talkgroups).

To further clarify the message sequence 200 of FIG. 2, a Dispatch call is initiated from a PS (Handset) 112 by the User performing some ergonomic action, (e.g. pressing PTT), at the PS 112 to initiate an internal (within the PS) Call Request message. Depending on the underlying protocols, this internal Call Request message gets translated, to a specific call SETUP (CC SETUP) message which requests Dispatch bearer service. This CC SETUP message contains the Individual address of the PS originating the call, plus the talkgroup ID of the destination talkgroup. The CC SETUP messages 234 are communicated between the PS 112 and the CS 120 using reliable call control procedures. This process reserves a communication slot for the call and directs the initiating PS 112 to an Assigned Communications Channel AC, using messages 204 and 208, the synchronization handshake 212 and 216, and establishing acknowledged error handling 222 and 228. The CC SETUP message 234 is sent on this reliable channel. This process is followed by transmission by the CS 120 of a CC Call Proceeding message 238 transmitted over the Assigned Channel AC. Following this communications channel reservation, the reliable signaling link between the PS 112 and Control Center Station CS 120 is removed. The initiating PS 112 continues to listen on the Assigned Communications Channel AC.

At this point, the Control Center Station CS 120 begins to continuously transmit on the Paging Channel PC, a Link Channel Assignment with call type "Dispatch Gather." This LINK CHANNEL ASSIGN(DISPATCH) message 242 contains the talkgroup ID of the destination talkgroup, the individual ID of the initiating PS 112 and the channel identifier for the Assigned Communication Channel AC. This inclusion of the requesting PS ID allows receivers of the assignment to determine which PS requested the call. The LINK CHANNEL ASSIGN(DISPATCH) message 242 (Dispatch Gather) on the Paging Channel PC can be received by any member of the talkgroup which may be monitoring for this page. This Dispatch Gather 242 instructs any participating PS to begin listening on the Assigned Channel AC.

Since LINK CHANNEL ASSIGN(DISPATCH) Gather messages 242 are sent on the unreliable Common Control Channel CH using the Paging frame (i.e. the Paging Channel PC), they are repeated for the duration of the call. This enables all members of the talkgroup to be notified of the call, whenever they come within radio coverage or otherwise late join.

In general, there will be some delay between when a Control Center Station CS 120 returns a CC Call Proceeding message 238 and when a Dispatch Gather (a LINK CHANNEL ASSIGN (DISPATCH) gather message) can be scheduled on the Paging Channel PC. The Control Center Station CS 120 waits until after the first Dispatch Gather 242 is transmitted, before sending a sequence of unreliable unacknowledged CC CONNECT messages 244 on the Assigned Communication Channel AC. These CC CONNECT messages 244 contain the Individual ID of the initiating PS. The initiating PS 112 should not begin transmitting voice until successful reception of one of these CC CONNECT messages 244, containing its own Individual ID. At this time, the originating PS is permitted to transmit voice as DISPATCH VOICE CALL 244. Upon receiving voice packets, the Control Center Station CS 120 stops sending CC CON- NECT messages, and repeats the voice audio to anyone listening on the Assigned Channel AC.

Figure 3:
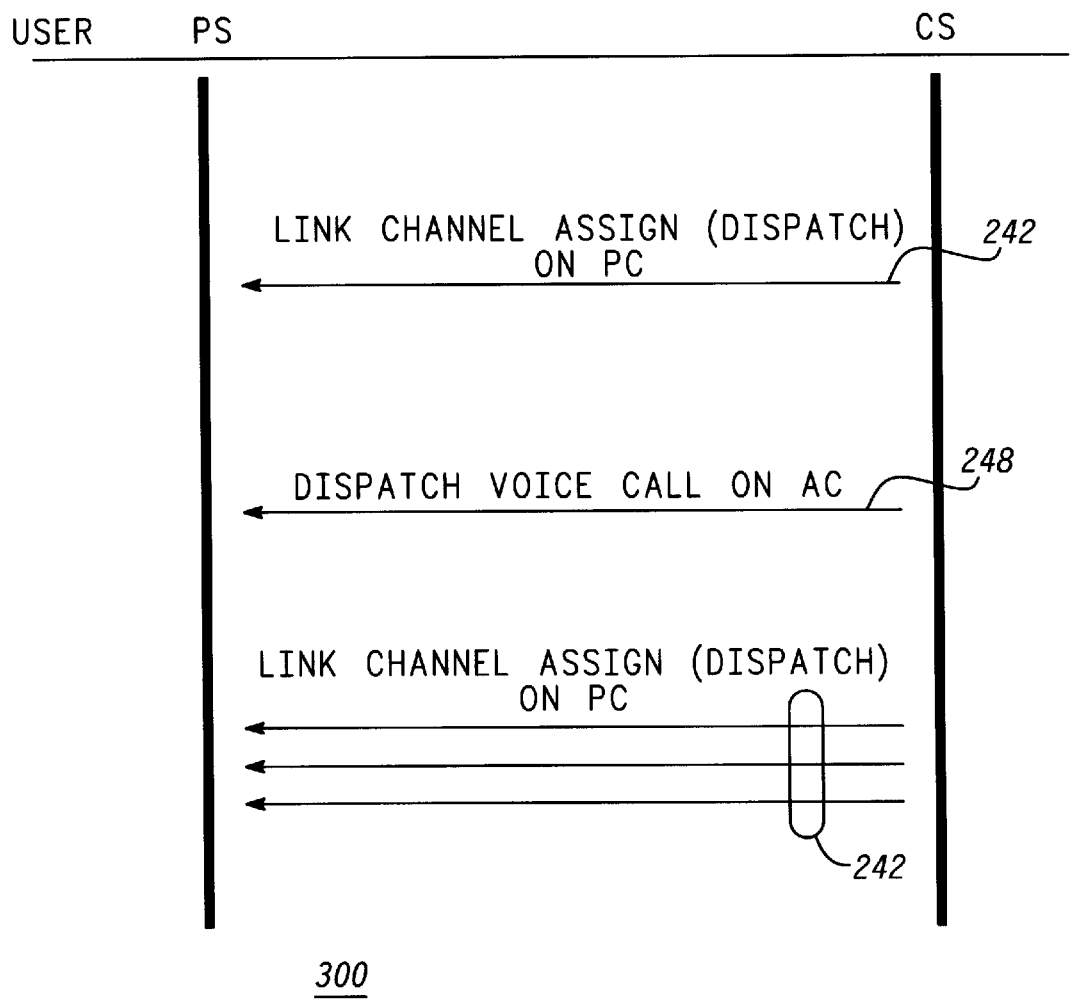
FIG. 3 is a message flow diagram illustrating a receipt of a one-to-many dispatch call according to embodiments of the present invention.

Referring now to FIG. 3, a Message Flow diagram illustrates receipt of a one-to-many Dispatch call in accordance with embodiments of the present invention. In the message flow diagram 300, the Personal Station (PS) represents, for example, PS 114, 116 or 118 of users 104, 106 and 108. For purposes of illustration, assume that the PS of FIG. 3 is PS 114 and the user is User 104. The LINK CHANNEL ASSIGN (DISPATCH) message transmitted over the Paging Channel PC as message 242 is received by the PS 114 to alert the PS 114 to look for information on the assigned TDMA slot. PS 114 receives voice data 248 on this assigned TDMA slot (AC), and will also periodically receive repeated LINK CHANNEL ASSIGN (DISPATCH) messages 242 on the Paging Channel PC as long as the Assigned Channel AC remains assigned to the Talkgroup 100. The LINK CHANNEL ASSIGN (DISPATCH) message 242 contains information such as the ID of the talkgroup and the ID of the originating talker (PS 112) along with talkgroup call gather message attributes and the slot number of the Assigned Channel AC. With this information, a recipient's PS such as 114 has all of the information necessary to utilize the Assigned Channel AC TDMA slot to hear the dispatch voice call. With this information, the PS 114, 116 and 118 are instructed to go to the Assigned TDMA Channel AC and receive voice signals by appropriately un-muting the radiotelephone and decoding the transmitted voice message.

In the receive process of FIG. 3, a PS, monitoring the Paging Channel PC for a Dispatch talkgroup in which it is participating, receives a LINK CHANNEL ASSIGNMENT (DISPATCH) gather message 242. This message contains the talkgroup ID of the Talkgroup, the Individual ID of the initiating PS, and the channel identifier for the Assigned Communications Channel AC. The receiving PS may display to the User the Individual ID of the originating caller, and/or otherwise indicate the presence of a Dispatch reception. The receiving PS may then listen on the indicated Assigned Channel AC for voice. Note that this signaling transaction with the receiving handset uses only the unacknowledged services of the Paging Channel PC. LINK CHANNEL ASSIGNMENT (DISPATCH) gather messages 242 are repeated on the Paging Channel PC for the benefit of any late joiners.

Figure 4:
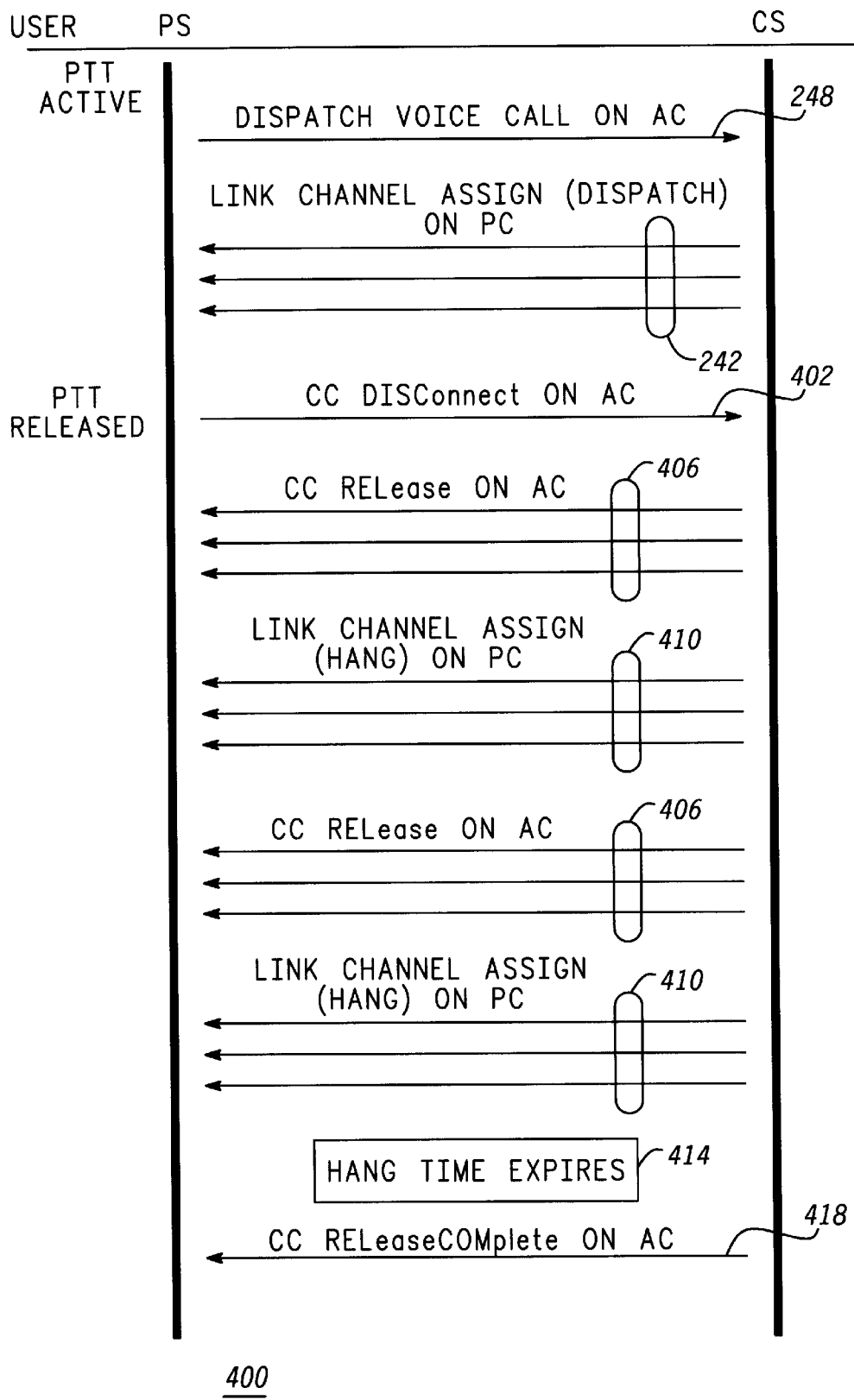
FIG. 4 is a message flow diagram illustrating a method for release of a one-to-many dispatch call according to embodiments of the present invention.

Most telephone-oriented systems require reliable procedures for terminating a call. With one-to-many Dispatch calls, the call termination procedures can be modified as shown in FIG. 4. Referring now to FIG. 4, a Call Tear Down process 400 is described from the perspective of the originating caller (or other caller dispatching a voice call), 112. It should be noted, that when the outgoing dispatch voice call 248 is completed by a first user, any other user in the Talkgroup 100 may connect in a simplex communication process by simply keying up his transceiver (i.e. push the PTT button). This will become clear upon consideration of FIG. 5, but first consider the process of tearing down the Assigned Communication Channel AC established as described in FIG. 2. This process can be viewed as a continuation of the process shown in FIG. 2. As long as the user wishes to talk, he maintains his Push-To-Talk switch in an active state causing dispatch of his voice data over the Assigned Channel AC. All the while, repeated LINK CHANNEL ASSIGN (DISPATCH) messages 242 are arriving on the Paging Channel PS at all receivers (PSs) in the talkgroup 114, 116, 118.

Upon release of the Push-To-Talk switch, the transmitting PS first stops transmitting voice data on the uplink AC, and at least one CC DISConnect message 402 is transmitted from the PS 112 to the CS 120 over the Assigned Channel AC. In general, for reliable operation the PS 112 may repeat this CC DISConnect message several times, until hearing the CC RELease message 406 returned from the CS 120. Upon hearing this CC DISConnect message 402, or the absence of voice data 248 for some timeout duration, the CS 120 will begin transmitting repeated CC RELease messages 406 on the AC. These CC RELease messages inform all listening talkgroup members that the transmitting PS has finished talking. LINK CHANNEL ASSIGN (HANG) messages 410 are transmitted repeatedly on the Paging Channel PC. These messages inform any late joining PS's that a Dispatch call is in progress, but at the moment no PS is transmitting. In this context the term HANG basically refers to a HANG Timer or a Time-Out Timer which is used to await any other user of the Talkgroup's Assigned Channel AC to key up his PTT switch and resume the communication. At 414 the Hang time expires signifying to the CS 120 that the one-to-many Talkgroup call has ended. At this point, the CS 120 transmits a CC RELeaseCOMPlete message 418 over the Assigned Channel AC, which signifies the relinquishment of the assignment of the designated TDMA slot by the Talkgroup. The repeated LINK CHANNEL ASSIGN (HANG) messages at this time stop.

With a Dispatch call already in progress, the talker is transmitting voice as the voice data 248 on the Assigned Communications Channel AC. The Control Center Station 120 periodically sends LINK CHANNEL ASSIGN (DISPATCH) gather messages 242 on the Paging Channel PC, indicating the Individual ID of the Talking PS. Upon finishing, the talking User performs some ergonomic action, (e.g. release PTT) which generates an internal disconnect message. Depending on the underlying protocols, (for example, PHS), this internal disconnect message is translated into the CC DISConnect message 402. This CC DISConnect message 402 contains the Individual ID of the talking PS. The talking PS stops transmission of voice, and transmits one or more unacknowledged CC DISConnect message 402 on the Assigned Communications Channel AC.

Upon receiving a CC DISConnect message 402 containing the Individual ID of the PS which is currently permitted to talk, or upon absence of voice reception for some timeout duration, the Control Center Station CS 120 (e.g. a Cell Station in a cellular system) starts a Hang Timer, and begins to continuously transmit CC RELease messages 406 on the Assigned Communications Channel AC. The CS 120 also changes the LINK CHANNEL ASSIGN (DISPATCH) Gather messages on the Paging Channel PC to LINK CHANNEL ASSIGN (HANG) messages 410 to indicate to any late joining PSs the current hanging status of this call. The repeated received CC RELease messages on the Assigned Channel AC, (along with absence of voice), will indicate to any listening PSs to mute their audio.

Upon expiry of the Hang Timer, the CS 120 transmits one or more unacknowledged CC RELeaseCOMPlete messages 418 over the Assigned Channel AC. This, or absence of voice, or absence of CC RELease messages for some interval, indicates to any listening PS that the call is no longer in progress, and the Assigned Communications Channel AC is no longer assigned to the talkgroup.

Figure 5:
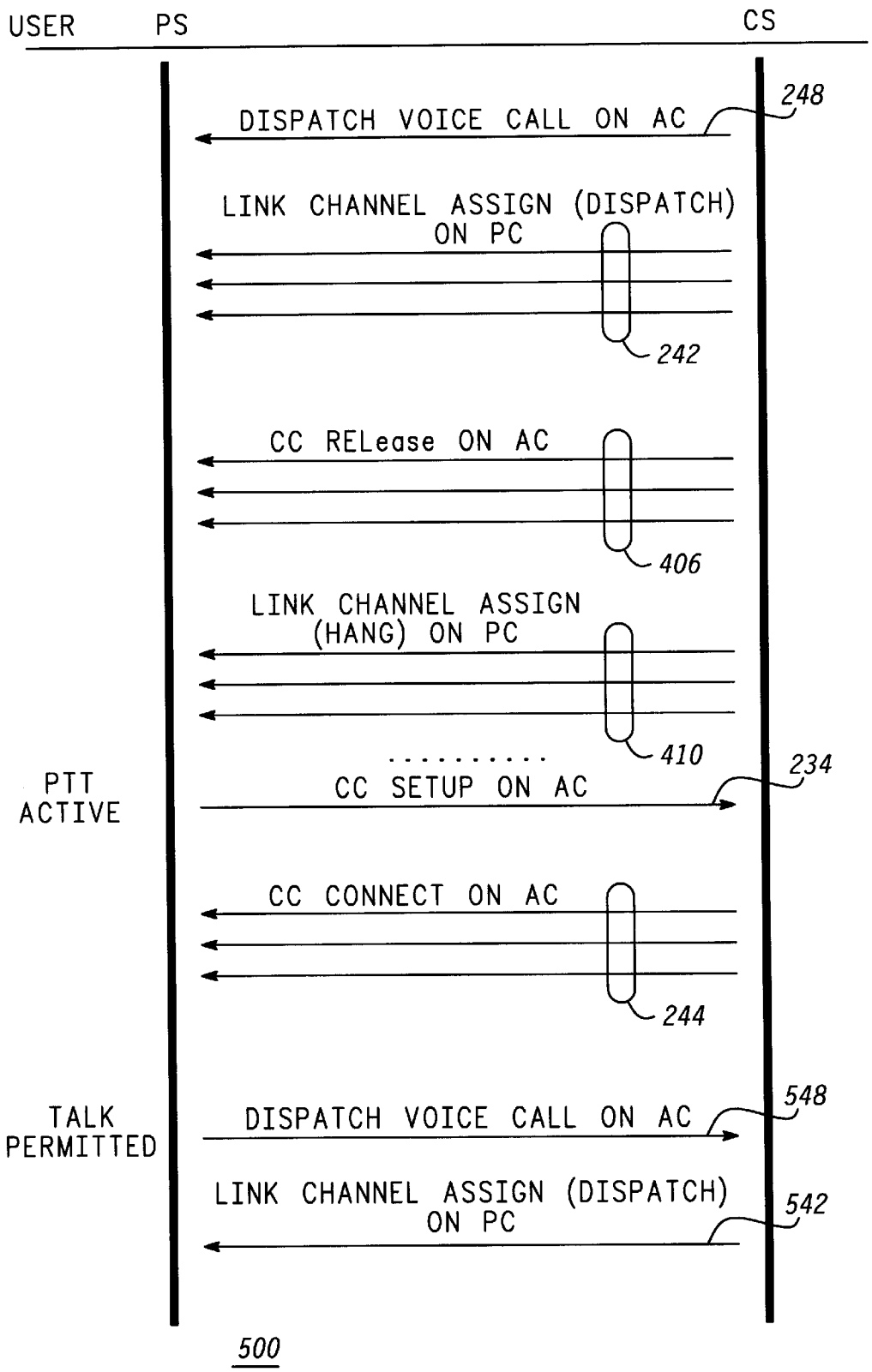
FIG. 5 is a message flow diagram illustrating a method for continuing a one-to-many dispatch call according to embodiments of the present invention.

During the course of a one-to-many Dispatch call, one Talker may finish talking, and another (or the same) talkgroup member may wish to take over talking. This could be accomplished each time by setting up and gathering an entirely new call. However, the use of the more typical call control methods for switching the designated Talker in such a call would interpose considerable protocol overhead, resulting in unnatural conversation delays. Thus, some low overhead method is desirable to transfer the Talker in such a call, along with some method for indicating the status of the current call to anyone joining late on the Control Channel CCH. During the course of a Dispatch conversation, there may also be intervals of silence, where no one is presently talking. A low overhead protocol should be made available to control the audio muting of the PS units participating in this call, and the eventual release of channel resources following expiration of this silent "hang time" in absence of any new Talker taking over the call. Concurrently, there should advantageously be a mechanism to indicate the status of such a hanging call to any PS late joining the control channel. FIG. 5 depicts such a call re-keying scenario.

Referring now to FIG. 5, a process 500 is illustrated wherein a party can either join a one-to-many Talkgroup dispatch communication in progress or can reply to voice communication 248. This illustration is again from the perspective of a user such as user 104 receiving a voice message 248 via his PS 114. At the end of the voice message 248, the CS 120 will begin transmitting CC RELease messages 406 on the Assigned Channel AC and LINK CHANNEL ASSIGN (HANG) messages 410 on the Paging Channel PC.

That is, while voice is continuing, voice is sent on the AC, and LINK CHANNEL ASSIGN(DISPATCH) messages 242 are repeated on the Paging Channel PC. As soon as voice ends, the CS 120 replaces the voice with CC RELease messages 406, and replaces the Paging Channel LINK CHANNEL ASSIGN(DISPATCH) messages 242 with LINK CHANNEL ASSIGN(HANG) messages 410. This is exactly like the normal call termination sequence in FIG. 4.

The CC RELease messages 406 indicate to any member of the talkgroup listening on the AC that the talking PS has finished, and the channel is available. As long as the Hang timer has not timed out, any user in the Talkgroup can push his Push-To-Talk switch which initiates a CC SETUP message 234 transmitted from the PS to the CS 120 over the Assigned Channel AC. This CC SETUP message 234 contains the ID of the new requesting PS. Note that this message, unlike FIG. 2 234, is sent to the CS 120 without establishing reliable acknowledged communication. This allows a faster transaction. To assure reliability without establishing acknowledged mode, the requesting PS may automatically retry if the expected CC CONNECT response is not returned. The CS 120 replies with CC CONNECT messages 244, containing the ID of the new allowed talker PS. This ID is required to positively identify the allowed talker should several PS's be simultaneously requesting. These CC CONNECT messages 244 are repeated as previously over the Assigned Channel. Upon receipt of the CC CONNECT message 244, the PS is permitted to transmit voice data 548 over the Assigned Channel AC. LINK CHANNEL ASSIGN (DISPATCH) messages 542 are again continuously transmitted from the CS 120 as if the user had initiated the one-to-many dispatch call.

In the scenario of 500, a Dispatch call is already in progress, with voice being received as voice data 248 on the Assigned Channel AC, and LINK CHANNEL ASSIGN (DISPATCH) gather messages 242 repeated on the Paging Channel PC. At some time, the current Talker releases PTT, stopping the voice transmission, and sending a CC DISConnect message to the Control Center Station CS 120 as described above. A receiving PS begins to detect repeated CC RELease messages 406 on the Assigned Channel AC. Receiving PS units will mute their received audio. The LINK CHANNEL ASSIGN (HANG) messages 410 are repeated on the Paging Channel PC, indicating the hanging call status to any late joiners.

If a User member participating in this talkgroup call now wishes to talk, the User may perform some ergonomic action (e.g. press PTT). If the PS wishing to talk is currently receiving valid CC RELease messages indicating the Assigned Channel AC is not occupied with a Voice Dispatch Message, the PS generates a call request message which produces a single unacknowledged CC SETUP message 234 on the Assigned Channel AC to the CS 120. Note that it was not necessary to go through the normal channel establishment procedures, as the Assigned Channel is already in place for this Dispatch call. This CC SETUP is sent unacknowledged, and may be repeated in absence of subsequent unacknowledged CC CONNECT messages 244. This CC SETUP message 234 contains the Individual ID of the new PS wishing to talk, and the talkgroup ID of the talkgroup.

Note that if a PS wishing to talk is not currently receiving valid CC RELease messages, it may indicate that the Assigned Channel AC is not actually free, the PS may be outside radio coverage, or the channel may not be available due to some other reason, e.g. timeout. In such cases, the PS should not transmit any CC SETUP messages, and may inform the requesting User of a channel busy condition.

The CS 120 may grant this new, or any other new, PS the right to talk, by repeating CC CONNECT messages 244 on the Assigned Channel AC. These CC CONNECT messages 244 contain the Individual ID of the PS being granted, and the talkgroup ID of the talkgroup. Upon receiving such a CC CONNECT grant, with Individual ID matching its own, and talkgroup ID matching the participating talkgroup, a requesting PS is allowed to transmit voice as voice data 548. A PS receiving a CC CONNECT message 244 that has a non-matching Individual ID, or a different talkgroup ID, is not allowed to transmit voice. Receiving a different talkgroup ID forces a receiving PS to immediately exit the communications channel. Receiving the correct talkgroup ID, but a different Individual ID, or receiving voice in absence of any CC CONNECT message reception, indicates to the requesting PS that the Assigned Channel AC has been granted to a different PS. The PS may indicate a busy condition to the requesting User, and prepare to un-mute for voice reception. The Individual ID provided in the CC CONNECT message 244 may be used to inform any receivers of the current Talker, as can the Individual ID provided in the repeated LINK CHANNEL ASSIGN (DISPATCH) gather messages 542, indicating the status of the call to late joiners.

Figure 6:
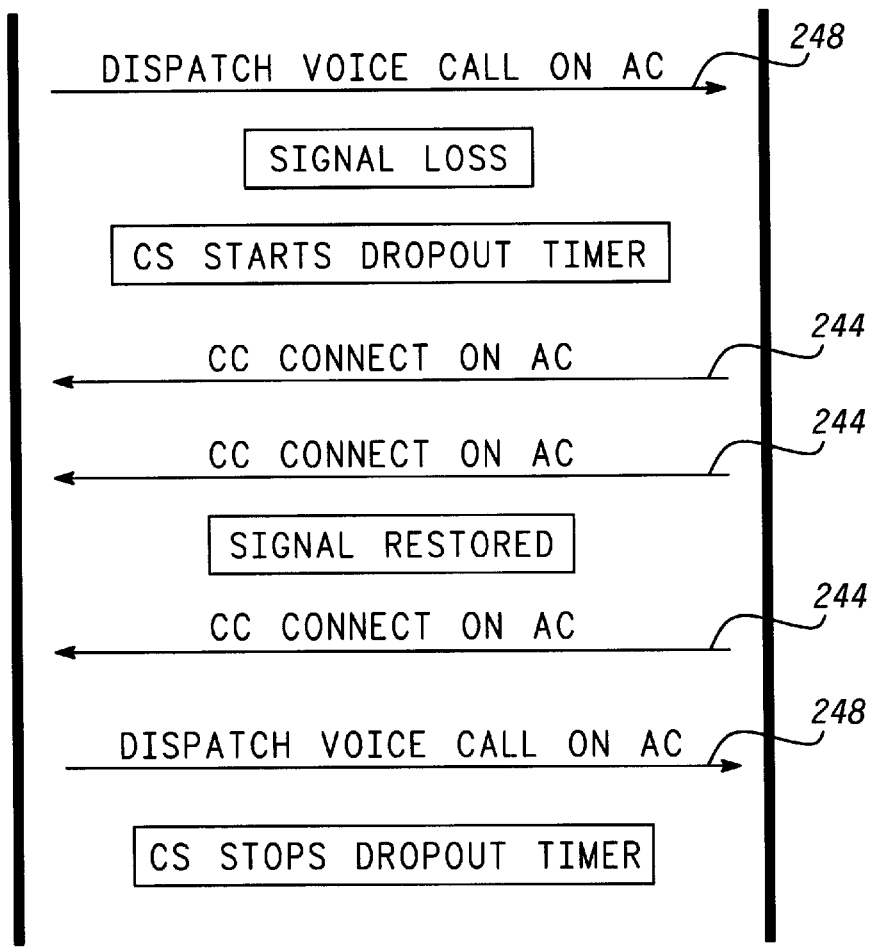
FIG. 6 is a message flow diagram illustrating a method for handling signal loss during a dispatch voice message in accordance with embodiments of the present invention.

Normally, a talking PS giving up the channel sends repeated CC DISConnect messages 402. The CS 120 receives these and returns repeated CC RELease messages 406, starts the hang timer, etc. as described in connection with FIG. 4. It is possible, however, that a talking PS will lose radio coverage (e.g. by moving out of range of CS 120), and the CS 120 will stop receiving the signal. This scenario is illustrated in FIG. 6. In the scenario described in FIG. 4, the CS 120 immediately begins repeating CC RELease messages upon detection of lost signal. In the scenario here, for momentary losses of signals when the CS 120 stops receiving voice on the AC, the CS 120 starts a momentary dropout timer. The CS 120 also begins transmitting repeated CC CONNECT messages 244, containing the ID of the allowed talker. Should the allowed talking PS come back into radio range, upon hearing a CC CONNECT message having its own ID, it will know that it still can talk, and can continue to do so. The CS 120 then replaces the CC CONNECT message 244 with voice, stops the dropout timer, and further communication proceeds as previously described. Should the PS not come back into range, the dropout timer will expire, and the CS 120 will replace the CC CONNECT 244 messages with CC RELease messages 406. The termination of the call will then proceed as in FIG. 4.

The various messages exchanged to effect the present invention in a PHS environment such as the Japan Handy-Phone system are described in TABLE 1 below:

TABLE 1

| MESSAGE TYPE | CHANNEL | DATA CARRIED |
| --- | --- | --- |
| Link Channel Establish Request | CCH | a) Indication of resources being requested, (i.e. Dispatch communication), b) ID of PS seeking connection, c) talkgroup ID |
| Link Channel Assignment | CCH | a) Channel Assignment, (i.e. slot number of AC, and RF channel number (if needed)), b) ID of PS granted AC, c) talkgroup ID |
| Sync Burst | AC | Synchronization information |
| SABM | AC | Error Control Information |
| UA | AC | Error Control Information |
| CC SETUP | AC | a) ID of PS seeking connection, b) talkgroup ID |
| CC Call Proceeding | CCH | a) Call status indication. b) ID of PS seeking connection (optional), c) talkgroup ID (optional) |
| LINK CHANNEL ASSIGN (DISPATCH) | CCH in Paging slot | a) Channel Assignment, (i.e. slot number of AC, and RF channel number (if needed)), b) ID of PS granted AC, c) talkgroup ID d) Call status (someone's talking) |
| CC CONNECT | AC | a) ID of PS granted connection, b) talkgroup ID |
| CC RELease | AC | a) talkgroup ID |
| CC DISConnect | AC | a) talkgroup ID |
| LINK CHANNEL ASSIGN (HANG) | CCH in Paging slot | a) Channel Assignment, (i.e. slot number of AC, and RF channel number (if needed)), c) talkgroup ID d) Call status (hanging) |
| CC RELeaseCOMplete | AC | a) talkgroup ID |
| DISPATCH VOICE CALL | AC | Voice data |

Thus, the feature provided to the end customer by this invention is functionally similar to Talk Group communication, which has been available in trunked radio systems (such as those produced by Motorola, Inc.) for quite some time. The current embodiment can be applied to the RCR STD-28 PHS (Japan HandyPhone). The embodiment described is implemented in such a manner as to remain in compliance with the public PHS standard, and could be overlaid over a Public system to add dispatch capability to existing public networks. Those having ordinary skill in the art will understand that although an TDMA embodiment of this invention has been disclosed in connection with the PHS implementation, many variations exist and the present invention should not be limited to the PHS environment or TDMA since equivalents using CDMA and other technologies can be readily devised without departing from the invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of carrying out a one-to-many Dispatch call among members of a talkgroup on a telephone system, comprising:

over a Control Channel, establishing an Assigned Communication Channel for sending a call setup message from a personal station having a personal station ID to a Control Station, using a Request message containing a talkgroup ID for the talkgroup;

sending gather messages containing the talkgroup ID on a common Paging Channel PC;

sending connect messages containing the first personal station ID on the Assigned Communication Channel indicating to the first personal station the right to transmit information on the communications channel;

transmitting information from the first personal station on the Assigned Communication Channel;

detecting a signal loss in the transmitted information; and initiating a dropout timer.

2. The method in accordance with claim 1, further comprising:

transmitting connect messages containing the first personal station ID on the Assigned Communication Channel for a duration of the dropout timer.

3. The method in accordance with claim 1, further comprising:

transmitting release messages over the Assigned Communication Channel after the duration of the dropout timer expires.

4. The method in accordance with claim 2, further comprising:

receiving an information transmission from the first personal station during said dropout timer; and stopping the dropout timer in response to receiving the information transmission.

* * * * *